United States Patent Office 3,655,596
Patented Apr. 11, 1972

3,655,596
SHORT OIL ALKYD RESINS
Haruo Kozu, Morio Kimura, Tadashi Watanabe, and Naozumi Iwasawa, Hiratsuka, and Michio Yoshida, Amagasaki, Japan, assignors to Kansai Paint Company, Limited, Amagasaki-shi, Japan
No Drawing. Filed Mar. 18, 1970, Ser. No. 20,813
Claims priority, application Japan, Mar. 26, 1969, 44/22,364
Int. Cl. C08g 17/16; C09d 3/64
U.S. Cl. 260—22 R
9 Claims

ABSTRACT OF THE DISCLOSURE

Short oil alkyd resins suitable for use in both baking type and non-baking type paints, and being excellent in hardness, toughness, chemical resistance, compatibilty with other film-forming materials, etc., and being made from polybasic acids, glycols and tetrahydric and/or trihydric alcohols, and saturated and/or unsaturated fatty acids having 6-18 carbon atoms.

---

This invention relates to the short oil alkyd resins characterized by the fact that the polymerization of said resins is effected under the conditions that the "Average number of functional groups of polyhydric alcohol composition" is adjusted to a number in a certain numerical range and the "content of fatty acids" is adjusted to 10–20% by weight.

There have generally been used as short oil alkyl resins, resins having a content of at least 25% by weight of $C_{12}$–$C_{18}$ saturated and/or unsaturated fatty acids. There have also been used oil-free alkyd resins containing no fatty acids. As used herein the "content of fatty acids" is defined by the following formula:

(Content of fatty acids)

$$= \frac{(\text{Fatty acids used})}{(\text{Raw materials}) - (\text{Theoretical dehydration})}$$

$\times 100$ (percent by weight)

The resins containing fatty acids will be hereinafter referred to as "alkyd resins" and the resins containing no fatty acids as "oil-free alkyd resins."

The "alkyd resins" and "oil-free alkyd resins" have many defects, and therefore short oil alkyd resins containing fatty acids in the amount of 10–20% by weight and intermediate in property between the "alkyd resins" and "oil-free alkyd resins" have been sought. However, if the average number of functional groups of polyhydric alcohol composition is the same as the alkyd resins generally used in producing said short oil alkyd resins, the reaction product produced will be liable to have a structure with many branches and to gel during the practice of the manufacturing operation. In general, the average number of functional groups of polyhydric alcohol composition is more than 3, wherein "average number of functional groups of polyhydric alcohol composition" as hereinafter used is defined as follows;

(Average number of functional groups of polyhydric alcohol composition)

$$= \frac{(\text{Total number of hydroxyl groups of di- or higher hydric alcohols contained in the raw materials used})}{(\text{Total number of molecules of di- or higher hydric alcohols contained in the raw materials used})}$$

Thus, to avoid the gelling of the short oil alkyd resins produced, if the resins having a polyhydric alcohol composition generally used and a content of fatty acids of 10–20% by weight are polymerized to low degree of condensation, the resulting resin will be low in flexibility at its main molecule chain and will be hard but brittle as a defect because of its low content of fatty acids as plasticizer. Since such a resin of low polycondensation degree contains many hydroxyl and carboxylic groups left unreacted in the molecule, it has therefore a great polarity which causes low solubility in solvents and poor compatibility with other resins. This resin will cause poor storage stability of a paint in which it is used. In addition, because of its wide distribution of molecular weights and particularly because of its content of a large proportion of the low molecular weight resin having a great polarity, it is liable to cause cratering, fish eyes and the like when a paint, which contains it, is coated.

The object of this invention is to provide short oil alkyd resins which overcome the above-mentioned defects and are excellent in performance.

The gist of this invention resides in the fact that the desired short oil alkyd resins can be prepared by adjusting the composition of polyhydric alcohols used so that their average number of functional groups is limited, depending upon the content of fatty acids, to a number within a certain desired numerical range. More particularly, this invention relates to alkyd resins from polybasic acids, glycols and tetrahydric and/or trihydric alcohols, and saturated and/or unsaturated fatty acids having 6–18 carbon atoms, characterized by adjusting the composition of the polyhydric alcohols in such a manner that their average number of functional groups falls within the numerical range expressed by a four-sided figure, the intersecting points of which are positioned at points, (10 wt. percent, 2.25), (20 wt. percent, 2.45), (10 wt. percent, 2.55) and (20 wt. percent, 2.75) in the co-ordinate system consisting of the abscissae indicating the wt. percent of fatty acids and the ordinate indicating the average number of functional groups.

Polybasic acids which may be used in the preparation of short oil alkyd resins according to this invention, include aromatic carboxylic acids and their anhydrides such as phthalic, isophthalic, terephthalic, trimellitic acids, and the like acids; cycloaliphatic dibasic carboxylic acids and their anhydrides for example, tetrahydrophthalic, hexahydrophthalic, tetrachlorophthalic, tetrabromophthalic, 3,6-endomethylene-$\Delta^4$-tetrahydrophathalic and 3,6-endodichloromethylene-$\Delta^4$-tetrachlorophthalic acid and their acid anhydrides; aliphatic dibasic carboxylic acids and their anhydrides for example, succinic, maleic, adipic, azeaic and sebacic acid and their acid anhydrides; and the mixtures thereof.

Trihydric and tetrahydric alcohols which may be used, include glycerine, trimethylolethane, trimethylolpropane, 1,2,6-hexanetriol, pentaerythritol and the like.

Glycols which may be used in the invention are primary or secondary alcoholic ones, for example 1,2-glycols such as ethylene glycol, propylene glycol, 1,2-butanediol, 1,2-pentanediol, 2,3-pentanediol, threo-2,3-pentanediol, erythro-2,3-pentanediol, 3-methyl-1,2-butanediol; 1,3-glycols such as trimethylene glycol, β-butylene glycol, 2,4-pentanediol, 2,2-dimethyltrimethylene glycol, 2,2-dimethyl-1,3-butanediol, 2,2-dimethyl-1,3-pentanediol; 1,4-glycols such as tetramethylene glycol, 1,4-pentanediol, 3-methyl-2,5-pentanediol, 1,4-hexanediol, 2,5-hexanediol; and 1,5-glycols or 1,6-glycols such as pentamethylene glycol, 1,5-hexanediol, hexamethylene glycol. These glycols must be used in combination with at least one of the trihydric and tetrahydric alcohols to obtain the desired average number of functional groups of polyhydric alcohol composition.

Saturated and/or unsaturated fatty acids having 6–18 carbon atoms, which may be used, include common vegetable oils, their fatty acids, tall oil fatty acids, and $C_6$–$C_{18}$ aliphatic monobasic acids and the mixtures thereof.

The preparation of short oil alkyd resins according to this invention is quite the same as the known process for the production of the conventional alkyd resins except that the former needs special consideration to prevent the loss of low boiling glycols.

Alkyd resins having a content of more than 20% by weight of fatty acids will have the same drawbacks as the conventional resins. In other words, such alkyd resins will give coatings or films which are inferior in hardness, flexibility, anti-contamination, weatherproofing, overbaking tolerance and the like when coated.

The alkyd resins having a content of less than 10% by weight of fatty acids will be insufficient in solubility in non-polar solvents and compatibility with other elements used together therewith for forming coatings and will also be incerased in polarity, aggregating property and surface tension of the resin molecules. It is thus liable to create fish eyes, cratering and the like when coated. These disadvantages are the same as those the oil-free alkyd resins have had.

If the alkyd resins are prepared under the condition that the average number of functional groups of polyhydric alcohol composition is smaller than the numbers expressed by the straight line drawn between the two points, (10 wt. percent, 2.25) and (20 wt. percent, 2.45) in the co-ordinate system, such resins will be cured slowly and form a coating of low degree of crosslinking because of the decrease in number of reactive hydroxyl groups. Thus, the formed coating has the defects that it is soft and liable to be swollen in solvents. On the other hand, if the average number of functional groups is larger than the numbers expressed by the straight line drawn between the two points, (10 wt. percent, 2.55) and (20 wt. percent, 2.75), in the co-ordinate system, the resulting resin will have a low molecule main chain which is high in degree of branching and low in degree of growth thereby deteriorating the flexibility of the high molecular main chain. It will also have intermolecular bridge making points distributed in a more highly non-uniform way thereby rendering the stress concentration liable to be caused in the molecule and will therefore have the defects that it is liable to cause brittle rupture and deteriorate adhesiveness when coated to form a coating containing curing component such as aminoplast resin.

If, according to this invention, the branching of the molecular main chain of a resin to be obtained is decreased by adjusting the average number of functional groups of polyhydric alcohol composition to within said numerical range using trihydric or tetrahydric alcohols and glycols, the resins thus obtained will have a molecular main chain of an increased linear structure thereby enhancing the uniformity of the bridge making points in the network formed by the reaction with the curing component. The decrease in amount of fatty acids used to terminate the growth of molecular chains can increase the average molecular weight of the resins to be obtained, resulting in the enhancement of flexibility of the molecular main chain of the resins thus obtained. Such resins will not easily cause the stress concentration when coated to form a coating and its stress-relieving velocity is high, strength and better adhesiveness than the conventional short oil alkyd resins or oil-free alkyd resins when coated to form the film. If the resins are made to contain a small proportion of fatty acid, their intermolecular cohesive force, which is otherwise too high as in the oil-free alkyd resins, will be lessened and their solubility and compatibility will consequentially be improved thereby decreasing the defects to be attributed to their original non-improved properties mentioned above, when coated to form a coating. In addition, since the short oil alkyd resins, according to this invention, have a more uniform distribution of the branch making points and the low content of fatty acids as plastisizer, they will, when coated, give a coating characterized by being less swollen when contacted with solvents.

The short oil alkyd resins according to this invention are suitable for use in both "baking" type and "non-baking" type paints, and the films formed of these paints are excellent in hardness, toughness, chemical resistance, contamination resistance, overbaking tolerance and weathering durability compared with those formed of the conventional short oil alkyd resins and the same as those of the oil-free alkyd resins, and excellent in compatibility with other film-forming elements and workability in spray finishing, roller coating and other finishing compared with those formed of the oil-free alkyd resins. These excellent properties are not the same as the average values of the conventional short oil alkyd resins and oil-free alkyd resins. The short oil alkyd resins according to this invention are surprisingly superior to the conventional short oil and the oil-free alkyd resins in property of a film containing it, solubility, compatibility with other film-forming elements, and the above-mentioned properties. These effects will never be obtained unless the average number of functional groups of polyhydric alcohol composition used and the content of fatty acids are not limited to within said defined ranges, respectively, in the preparation of the short oil alkyd resin, which simultaneous limitation is the feature of this invention.

These and other features of the invention will be better understood by the following non-limitative examples. The parts and percentages used in the examples are by weight unless otherwise specified, and the numerals parenthesized represent a molar ratio.

EXAMPLE 1

Into a 0.5 lit. reacting vessel provided with a thermometer, stirrer, water separator and feed tube for an inert gas, were charged 111.4 parts (0.753) of phthalic acid anhydride, 29.3 parts (0.201) of adipic acid, 72.1 parts (0.601) of trimethylolethane and 41.5 parts (0.399) of neopentyl glycol. The resulting mixture was heated to 160° C. under agitation for 30 minutes and then increasingly heated to 230° C. in an additional two hours. When the reaction temperature reached to 230° C., 41.4 parts (0.197) of coconut oil fatty acid were added to the mixture and further heated at 230° C. for two hours introducing nitrogen gas into the reacting vessel. The reacting vessel was further charged with xylene in an amount of 5% of the whole material charged therein in order to promote the removal by azeotropic distillation of condensed water produced as a by-product by the esterification maintaining the temperature at 230° C. The heating was continued. When the product had an acid value of 5 mg. KOH/g. resin, the heating was stopped, and then the resin thus obtained was diluted with enough xylene to obtain a 60% solution of the resin. The viscosity of this 60% xylene solution was 10.7 stokes at 25° C. The content of fatty acid in the resin so obtained was 15.2% and the average number of functional groups of polyhydric alcohol composition was 2.60.

EXAMPLE 2

As in Example 1, there were reacted with each other 139.9 parts (0.945) of phthalic acid anhydride, 48.4 parts (0.403) of trimethylolethane, 62.1 parts (0.597) of neopentyl glycol and 41.4 parts (0.197) of coconut oil fatty acid. When the product had an acid value of 5 mg. KOH/g. resin, the resin thus obtained was diluted with enough xylene to obtain a 60% solution thereof. The viscosity of this solution was 6.0 stokes at 25° C. The content of fatty acid in the resin so obtained was 15.3% and the average number of functional groups of polyhydric alcohol composition was 2.40.

EXAMPLE 3

In accordance with the procedure of Example 1, 127.1 parts (0.859) of phthalic acid anhydride, 14.9 parts (0.102) of adipic acid, 31.3 parts (0.230) of pentaerythritol, 47.7 parts (0.770) of ethylene glycol and 49.8 parts (0.178) of soyabean oil fatty acid were reacted with one another. When the product had an acid value of 5 mg. KOH/g. resin, the resin thus obtained was diluted with xylene enough to make a 60% solution thereof, the viscosity of which was 8.8 stokes at 25° C. The resin so obtained had a content of 20.0% of fatty acid and the average number of functional groups of polyhydric alcohol composition used was 2.46.

EXAMPLE 4

As in Example 1, there were together reacted 124.0 parts (0.747) of isophthalic acid, 28.9 parts (0.198) of adipic acid, 72.4 parts (0.603) of trimethylolethane, 41.3 parts (0.397) of neopentyl glycol and 41.6 parts (0.198) of average oil fatty acid. When the product had an acid value of 5 mg. KOH/g. resin, the resin thus obtained was diluted with sufficient xylene to obtain a 60% solution thereof having a viscosity of 17.6 stokes at 25° C. The resin so produced had a content of 15.4% fatty acid and the average number of functional groups of polyhydric alcohol composition used was 2.60.

EXAMPLE 5

In the same reacting vessel as used in Example 1 were charged with 50.1 parts (0.075) of alkaline refined coconut oil, 57.9 parts (0.432) of trimethylolpropane, 51.3 parts (0.493) of neopentylglycol and 0.025 parts (about 0.05% of the oil) of litharge, and the resulting mixture was heated at 220° C. for one hour while stirring to make it homogeneous. 112.0 parts (0.757) of phthalic acid anhydride and 30.1 parts (0.206) of adipic acid was added to the mixture and heated at 230° C. for two hours while stirring to make the whole material homogeneous, and then xylene was added in an amount of 5% of the whole material while maintaining the temperature at 230° C. The product had an acid value of 6 mg. KOH/g. resin. The resin so obtained was diluted with xylene to obtain a 60% solution thereof. The viscosity of this solution was 10 stokes at 25° C. The content of fatty acid in the resin so produced was 16.8% and the average number of functional groups of polyhydric alcohol composition was 2.51.

EXAMPLE 6

The same reacting vessel as used in Example 1 was charged with 102.7 parts (0.694) of phthalic acid anhydride, 47.2 parts (0.246) of trimellitic acid anhydride, 21.5 parts (0.147) of adipic acid, 72.2 parts (0.602) of trimethylolethane, 41.4 parts (0.398) of neopentyl glycol and 41.2 parts (0.196) of coconut oil fatty acid. The resulting mixture was heated to 150° C. under agitation while introducing nitrogen gas into the vessel, then maintained at this temperature for one hour and further heated gradually to 190° C. in two hours. The heating being stopped when the product had an acid value of 78 mg. KOH/g. resin; the reaction product was cooled to 130° C. and diluted with 300 parts of ethylene glycol monobutyl ether with stirring until the mixture was made homogeneous; and then the homogeneous mixture was mixed with 139 parts of diethanolamine and 400 parts of water stirring the whole material until homogenized to obtain a transparent 50% aqueous solution having a viscosity of 30 stokes at 25° C. The content of fatty acid in the resin thus obtained was 13.7% and the average number of functional groups of polyhydric alcohol composition was 2.60.

EXAMPLE 7

In the same manner as in Example 1, there were reacted with one another 112.5 parts (0.760) of phthalic acid anhydride, 27.7 parts (0.190) of adipic acid, 72.8 parts (0.700) of neopentyl glycol, 40.2 parts (0.300) of trimethylolpropane and 27.3 parts (0.130) of coconut oil fatty acid. When the product had an acid value of 5 mg. KOH/g. resin, the resin thus obtained was diluted with xylene enough to obtain a 60% solution thereof which showed its viscosity to be 6.3 stokes at 25° C. The content of fatty acid in the resin thus obtained was 10.6% and the average number of functional groups of polyhydric alcohol composition was 2.30.

EXAMPLE 8

Following the same procedure as in Example 1, there were together reacted 112.5 parts (0.760) of phthalic acid anhydride, 27.7 parts (0.190) of adipic acid, 46.8 parts (0.450) of neopentyl glycol, 73.7 parts (0.550) of trimethylolpropane and 27.3 parts (0.130) of coconut oil fatty acid. When the product had an acid value of 5 mg. KOH/g. resin, the resin thus obtained was diluted with xylene enough to make a 60% solution thereof. This solution had 12.9 stokes in viscosity at 25° C. The content of fatty acid in the resin so produced was 10.3% and the average number of functional groups of polyhydric alcohol composition was 2.55.

EXAMPLE 9

In the same manner as in Example 1, there were reacted with each other 140.6 parts (0.950) of phthalic acid anhydride, 40.2 parts (0.300) of neopentyl glycol, 93.8 parts (0.700) of trimethylolpropane and 60.2 parts (0.215) of soyabean oil fatty acid. When the product had an acid value of 5 mg. KOH/g. resin, the residue so obtained was diluted with enough xylene to obtain a 60% solution thereof having the viscosity of 8.8 stokes at 25° C. The content of fatty acid in the resin thus produced was 18.7% and the average number of functional groups of polyhydric alcohol composition was 2.70.

REFERENCE EXAMPLE

The same reacting vessel as used in Example 1 was charged with 103.6 parts (0.700) of phthalic acid anhydride, 33.6 parts (0.280) of adipic acid, 134.0 parts (1.000) of trimethylolpropane and 50.2 parts (0.239) of coconut oil fatty acid and then with 5% of xylene based on the whole material charged. The resulting mixture was heated to 230° C. under agitation and reacted at this temperature. When the product had an acid value of 15 mg. KOH/g. resin, the resin thus obtained was tried in vain to be dissolved in xylene and it was thus diluted to obtain a 60% solution thereof with ethylene glycol monoethyl ether acetate. This solution so produced had 16.7 stokes in viscosity at 25° C. The content of fatty acid in the resin so obtained was 16.9% and the average number of functional groups of polyhydric alcohol composition was 3.00.

Test 1

The short oil alkyd resins of this invention produced in Examples 1–9 (except Example 6), the alkyd resin obtained in said Reference Example, the conventional known alkyd resin and the oil-free alkyd resin were tested for solubility in various solvents and compatibility with other resins. In the solubility test 50 parts (by solid) of each of the said resins was incorporated with 50 parts of a solvent to determine its solubility. The compatibility test was conducted by preparing a solution containing each of the resins in the following ratio by weight, calculated as solid, spraying onto a glass plate enough of the solution to form a 30µ thick dry-film thereon and then baking. Baking conditions are shown in the parentheses for the resins which needed baking. The results obtained from the comparison test are shown in the following Tables I(a) and I(b).

TABLE I(a)

| Test sample | Solubility | | | |
|---|---|---|---|---|
| | Toluene | Xylene | Swasol P-1500 (Note 1) | Xylene/n-butanol= 80/20 |
| Resin of Example: | | | | |
| 1 | S | S | S | S |
| 2 | S | S | S | S |
| 3 | S | S | S | S |
| 4 | S | S | S | S |
| 5 | S | S | S | S |
| 7 | S | S | PS | S |
| 8 | S | S | S | S |
| 9 | S | S | S | S |
| Resin of reference example | IS | IS | IS | PS |
| Alkyd resin (Note 9) | S | S | S | S |
| Oil-free alkyd resin (Note 10) | PS | PS | PS | S |

See note at end of Table I(b).

TABLE I(b)

Amino resin:alkyd resin=30:70 (baking conditions: 140° C., 30 min.)
Acrylic resin:alkyd resin=50:50 (baking conditions: 80° C., 20 min.)
Nitrocellulose:alkyd resin=50:100 (non-baking)
Acetylbutylcellulose:alkyd resin=50:50 (non-baking)

| Test sample | Compatibility | | | | | | |
|---|---|---|---|---|---|---|---|
| | n-Butanol modified melamine-formaldehyde resin-1 (Note 2) | n-Butanol modified melamine-formaldehyde resin-1 (Note 3) | Nikalac NS #11 (Note 4) | Cymel 300 (Note 5) | Hitaloid 1206 (Note 6) | Nitrocellulose for paints RS 1/2 (Note 7) | EAB381-½ (Note 8) |
| Resin of Example: | | | | | | | |
| 1 | C | C | C | C | C | C | IC |
| 2 | C | C | C | C | C | C | C |
| 3 | C | C | C | C | IC | C | C |
| 4 | PC | C | C | C | C | C | IC |
| 5 | C | C | C | C | C | C | C |
| 7 | C | C | C | C | C | C | C |
| 8 | PC | C | C | C | C | C | IC |
| 9 | C | C | C | C | IC | C | IC |
| Reference example | IC | IC | PC | C | C | C | IC |
| Alkyd resin (Note 9) | C | C | C | C | C | C | IC |
| Oil-free alkyd resin (Note 10) | IC | IC | C | C | C | C | IC |

NOTE.—The symbols "S," "PS," "IS," "C," "PC" and "IC" represent "soluble," "partially soluble," "insoluble," "compatible," "partially compatible" and "incompatible," respectively.

NOTES

1: Aromatic solvent having a certain aliphatic hydrocarbon on its side chain produced by Maruzen Oil Co., Ltd., Japan.

2: Molar ratio of formaldehyde to melamine is 4.8:1.0.

3: Molar ratio of formaldehyde to melamine is 5.6:1.0.

4: Trade name of methanol-modified melamine resin produced by Nippon Carbide Co., Ltd., Japan.

5: Trade name of methanol-modified melamine resin produced by American Cyanamid Co.

6: Trade name of thermoplastic acrylonitrile resin produced by Hitachi Chemical Co., Ltd., Japan.

7: Trade name of nitrocellulose for paints, produced by Daicel Co., Ltd., Japan.

8: Trade name of acetylbutylcellulose produced by Eastman Chemical Products, Inc.

9: This resin was composed of phthalic acid anhydride, trimethylolpropane and coconut oil fatty acid in the molar ratio of 1.00:1.00:0.50. The content of fatty acid in the resin was 29.2% and the average number of functional groups of polyhydric alcohol composition was 3.00. A 60% nonvolatile matter of xylene solution of the resin had a viscosity of 6.3 stokes at 25° C.

10: The resin consisted of isophthalic acid, adipic acid, neopentyl glycol and trimethylolpropane in the molar ratio of 0.63:0.27:0.80:0.20. It contained no fatty acids, and the average number of functional groups of polyhydric alcohol composition was 2.20. The resin had an acid value of 7.5 mg. KOH/g. resin, and a 60% nonvolatile matter of an ethylene glycol monobutyl ether solution had a viscosity of 12.9 stokes at 25° C.

Test 2

A test for tensile strength was made on a baked coating film formed of a resin varnish prepared by mixing each of the resins of Examples 1 to 9 (except Example 6), Reference Example and Notes 1 and 2 shown in Table I, (a) and (b), with Nikalac NS #11 (methanol-modified melamine-formaldehyde resin produced by Nippon Carbide Co., Ltd.) in the ratio by parts of 75:25, calculated as solid.

The baked coating films were obtained by spraying the resin varnish onto a piece (300 x 200 x 0.3 mm.) of tin plate in such an amount as to form a coating of 65±5µ in thickness when dried, baking the coated tin plate pieces at 160° C. for 30 minutes and then peeling off the baked coating films from the pieces by means of mercury amalgamation process. The free films thus obtained were cut into pieces (20 x 5 mm.) which were then exposed to 60° C. for one day and to 20° C. for the next seven days. The pieces so treated were subjected to the test in which they were tensioned at a velocity of 40 mm./min., at 20° C., using a tester (Tensilon UTM II type manufactured by Toyo Sokki Co., Ltd., Japan).

Each of the pieces was tested three times and the average values are shown in Table II.

TABLE II

| Resin used | Breaking point (kg./cm.²) | Elongation at breaking point (percent) | Toughness (kg.·cm./cm²) (Note 1) |
|---|---|---|---|
| Resin of Example: | | | |
| 1 | 259 | 74 | 290 |
| 2 | 250 | 70 | 273 |
| 3 | 225 | 68 | 246 |
| 4 | 268 | 64 | 255 |
| 5 | 243 | 68 | 272 |
| 7 | 262 | 65 | 248 |
| 8 | 270 | 66 | 220 |
| 9 | 242 | 65 | 245 |
| Resin of reference example | 365 | 2 | 11 |
| Alkyd resin | 136 | 27 | 51 |
| Oil-free alkyd resin | 636 | 8 | 95 |

Note.—Toughness is expressed by the formula $$\int_0^{\chi^\alpha} f(\chi)d\chi \text{ kg.·cm./cm.}^2$$

wherein $\chi$ is an elongation (cm.), $\chi^\alpha$ an elongation (cm.) at breaking point and $f(\chi)$ a tensile strength (kg./cm.²) at the elongation $\chi$cm.

Test 3

The white enamels were tested for their performances. The white enamels were prepared by mixing the resin of each of Examples 1 to 9, Reference Example and Notes 9 and 10 of Test 1, with Nikalac NS #11 in the ratio by parts of 75:25, calculated as solid, and then mixing 100 parts (as solid) of the mixed resin with 50 parts of rutile type titanium dioxide to obtain a dispersion of the dioxide into the resin. An epoxy ester type primer was coated on pieces of zinc phosphate- treated iron plate with a Bar Coater (trade name of a coating machine manufactured by R. D. Specialities Incorporated) in such an amount as to form a 3μ thickness coating when the primer coated on the iron plate was baked, and the coated pieces were baked at 260° C. for 50 seconds to dry it. The coated pieces were further coated with said white enamels by a Bar Coater in such an amount as to form thereon a 12μ thickness in the dry film and then treating the pieces in such a manner that one-third thereof were baked at 250° C. for 50 seconds, another one-third thereof at 270° C. for 50 seconds, and the remaining one-third thereof at 290° C. for 50 seconds. The tests were carried out in the following manners: Testing method.

(1) Crosscut adhesion.—Number of frames not removed, by pressing on and rapidly removing Scotch tape, to 100 frames made of crosscut of 1 mm. space.

(2) Crosscut adhesion after Erichsen.—After 100 frames on the test panel were made of crosscut of 1 mm. space, 5 mm. of Erichsen Depth was made by Erichsen Tester. And then evaluated number of frames not removed by pressing on and rapidly removing Scotch tape.

(3) Impact resistance.—After mechanical shock was given on to coated surface of the test panel by Parlin Du Pont Impact Tester under conditions of ½", 500 g., 50 cm., Scotch tape was pressed on and rapidly removed. The symbol P represents no defect, and the symbol F represents removements of the film.

(4) Pencil hardness.—A set of pencils ranging from 6B soft to 6H hard was pushed in turn into the film at 45 degree to the surface. The hardest pencil by which film is not breaked is indicated as a pencil hardness.

(5) Bend test.—The test panel was set a vise and bent 90 degrees. The bent panel was pressed hard (to 180 degree). Scotch tape was pressed on and rapidly removed. If the film was caused to chip, the above-mentioned process was repeated except putting a piece of steel panel (0.27 mm. thickness) inner bending portion. Furthermore, if the film was still caused to chip, the number of steel panels was increased until no chipping occurred. The results are given the number of pieces of the steel panel put in. Therefore, the smaller in number is the more excellent in bending property.

(6) Salt spray test.—ASTM B117–62. The time of evaluation is time until corrosion or other failure appeared.

(7) Gloss (60 degrees) after out-of-door weather-durability test.—After the test panel was exposed out-of-door for a year according to ASTM D1014–51, gloss was measured by ASTM D523–62T.

(8) Solvent resistance.—The test was made three times on each of the test samples by rubbing it with a xylene-impregnated gauze held by human fingers until the surface of the under coating of the samples was bared, and the results were expressed in terms of the average frequency of the rubbing.

(9) Appearance of coating.—Visual observation of film with respect to leveling, wrinkles, fish eyes and cratering. The symbol G represents those with no defects.

The numerals 1, 2 and 3 of Note 1 represent the baking conditions of 250° C. for 50 seconds, 270° C. for 50 seconds and 290° C. for 50 seconds, respectively.

Note 2 means that because the alkyd resin of Example 6 was soluble in water, there was used a varnish prepared by mixing the alkyd resin with CYMEL 300 (a hexakismethoxymethylolmelamine produced by American Cyanamid Co.) in a ratio by parts of 80:20, calculated as solid.

TABLE III(a)

| Resins | Baking, Note 1 | Crosscut adhesion (20° C.) | Crosscut adhesion after Erichsen (20° C.) | Impact resistance (20° C.) | Pencil hardness (20° C.) | Bend test (20° C.) |
|---|---|---|---|---|---|---|
| Resin of Example 1 | 1 | 100/100 | 100/100 | P | 4H | 0 |
|  | 2 | 100/100 | 100/100 | P | 4H | 0 |
|  | 3 | 100/100 | 100/100 | P | 4H | 1 |
| Resin of Example 2 | 1 | 100/100 | 100/100 | P | 3H | 1 |
|  | 2 | 100/100 | 100/100 | P | 4H | 1 |
|  | 3 | 100/100 | 100/100 | P | 4H | 2 |
| Resin of Example 3 | 1 | 100/100 | 100/100 | P | 2H | 2 |
|  | 2 | 100/100 | 100/100 | P | 4H | 1 |
|  | 3 | 100/100 | 100/100 | P | 4H | 1 |
| Resin of Example 4 | 1 | 100/100 | 100/100 | P | 4H | 1 |
|  | 2 | 100/100 | 100/100 | P | 4H | 1 |
|  | 3 | 100/100 | 95/100 | P | 5H | 2 |
| Resin of Example 5 | 1 | 100/100 | 100/100 | P | 3H | 1 |
|  | 2 | 100/100 | 100/100 | P | 4H | 1 |
|  | 3 | 100/100 | 100/100 | P | 4H | 2 |
| Resin of Example 6 (Note 2) | 2 | 100/100 | 100/100 | P | 5H | 1 |
|  | 3 | 100/100 | 95/100 | P | 5H | 2 |

TABLE III(a)—Continued

| Resins | Baking, Note 1 | Crosscut adhesion (20° C.) | Crosscut adhesion after Erichsen (20° C.) | Impact resistance (20° C.) | Pencil hardness (20° C.) | Bend test (20° C.) |
|---|---|---|---|---|---|---|
| Resin of Example 7 | 1 | 100/100 | 100/100 | F | 3H | 2 |
|  | 2 | 100/100 | 100/100 | P | 4H | 1 |
|  | 3 | 100/100 | 100/100 | P | 5H | 1 |
| Resin of Example 8 | 1 | 100/100 | 100/100 | P | 4H | 1 |
|  | 2 | 100/100 | 100/100 | P | 5H | 1 |
|  | 3 | 100/100 | 80/100 | P | 5H | 2 |
| Resin of Example 9 | 1 | 100/100 | 100/100 | P | 2H | 0 |
|  | 2 | 100/100 | 100/100 | P | 4H | 1 |
|  | 3 | 100/100 | 85/100 | P | 4H | 3 |
| Reference example | 1 | 80/100 | 50/100 | P | 4H | 4 |
|  | 2 | 70/100 | 30/100 | F | 5H | 5 |
|  | 3 | 40/100 | 0/100 | F | 6H | 5 |
| Alkyd resin | 1 | 100/100 | 100/100 | F | HB | 2 |
|  | 2 | 95/100 | 95/100 | P | H | 1 |
|  | 3 | 80/100 | 75/100 | F | 2H | 3 |
| Oil-free alkyd resin | 1 | 100/100 | 100/100 | F | 4H | 2 |
|  | 2 | 100/100 | 95/100 | P | 5H | 1 |
|  | 3 | 100/100 | 70/100 | P | 5H | 1 |

TABLE III(b)

| Resin | Baking, Note 1 | Salt spray test (hr.) | Gloss (60°) after out-of-door weather durability test Initial | One year after | Solvent resistance (times at 20° C.) | Appearance of coating |
|---|---|---|---|---|---|---|
| Resin of Example 1 | 1 | 800 | 90 | 78 | 80 | G |
|  | 2 | >1,000 | 86 | 78 | >100 | G |
|  | 3 | >1,000 | 86 | 80 | >100 | G |
| Resin of Example 2 | 1 | 700 | 88 | 75 | 75 | G |
|  | 2 | >1,000 | 88 | 76 | >100 | G |
|  | 3 | >1,000 | 85 | 73 | >100 | G |
| Resin of Example 3 | 1 | 600 | 87 | 72 | 70 | G |
|  | 2 | 800 | 85 | 77 | 92 | G |
|  | 3 | >1,000 | 84 | 77 | >100 | G |
| Resin of Example 4 | 1 | >1,000 | 89 | 80 | >100 | G |
|  | 2 | >1,000 | 87 | 78 | >100 | G |
|  | 3 | >1,000 | 85 | 78 | >100 | G |
| Resin of Example 5 | 1 | 500 | 85 | 72 | 85 | G |
|  | 2 | 850 | 84 | 74 | 90 | G |
|  | 3 | 1,000 | 83 | 76 | >100 | G |
| Resin of Example 6 (Note 2) | 2 | 800 | 84 | 70 | >100 | G |
|  | 3 | >1,000 | 82 | 73 | >100 | G |
| Resin of Example 7 | 1 | 700 | 92 | 70 | 80 | G |
|  | 2 | >1,000 | 90 | 78 | >100 | G |
|  | 3 | >1,000 | 90 | 78 | >100 | G |
| Resin of Example 8 | 1 | 900 | 93 | 80 | >100 | G |
|  | 2 | >1,000 | 90 | 75 | >100 | G |
|  | 3 | >1,000 | 88 | 72 | >100 | G |
| Resin of Example 9 | 1 | 700 | 85 | 73 | 80 | G |
|  | 2 | 800 | 83 | 70 | 95 | G |
|  | 3 | >1,000 | 82 | 70 | >100 | G |
| Reference example | 1 | 800 | 70 | 45 | >100 | (1) |
|  | 2 | 1,000 | 62 | 38 | >100 | (1) |
|  | 3 | >1,000 | 55 | 35 | >100 | (1) |
| Alkyd resin | 1 | 300 | 90 | 65 | 10 | G |
|  | 2 | 500 | 85 | 62 | 30 | G |
|  | 3 | 700 | 81 | 62 | 50 | G |
| Oil-free alkyd resin | 1 | >1,000 | 88 | 72 | >100 | (1) |
|  | 2 | >1,000 | 85 | 74 | >100 | (1) |
|  | 3 | >1,000 | 85 | 74 | >100 | (1) |

1 Fisheyes and cratering are liable to be produced.

Test 4

There was prepared a white enamel in the form of an air drying type acetylbutylcellulose-modified acrylic resin paint in which a part of the acrylic resin has been substituted by the short oil alkyl resin of Example 3. The conventional alkyd resins have not been used in such a paint because of their poor compatibility with acetylbutylcellulose. The new white enamel thus prepared was tested for comparison with the conventional white enamel in performance. The composition of the new white enamel was as follows:

|  | Test 4 | Conventional enamel |
|---|---|---|
| EAB 381-1/2 (produced by Eastman Chemical Products, Inc.,) | 100 | 100 |
| Hitaloid 1206 (produced by Hitachi Chemical Co., Ltd., Japan) | 200 | 250 |
| Resin of Example 3 | 50 | ------ |
| Titanium white R 500 (produced by Ishihara Sangyo Kaisha, Ltd., Japan) | 117 | 117 |
| Total | 467 | 467 |

Pieces (300 x 80 x 1 mm.) of mild steel plate polished with stand paper and degreased with xylene were sprayed with enough of an aminoalkyd resin paint for automobiles to form thereon a coating which would have a thickness of 50±5µ when dried and were then baked at 140° C. for 30 minutes. The coated pieces thus baked were ground with a waterproofed sandpaper using water. Some of the pieces thus obtained were further coated with the above-mentioned new enamel paint (this paint being diluted with a thinner so that the viscosity being 15–16 seconds by Ford Cup (No. 4) in such an amount as to form a coating which would be 50±5µ in thickness when dried, and then dried at 20° C. for 48 hours to obtain test panels; while the rest of the coated pieces were coated with the conventional enamel paint for comparison as the same manner. The results obtained from Test 4 are indicated in the following Table IV.

in proportions such that the average number of hydroxy functional groups per each polyol molecule varies substantially linearly from 2.25 to 2.55 at 10% by weight fatty acid to 2.45 to 2.75 at 20% by weight fatty acid.

2. The short oil alkyd resin of claim 1, wherein the polybasic acid is selected from the group consisting of aromatic carboxylic acids, cycloaliphatic dibasic carboxylic acids, aliphatic dibasic carboxylic acids and their acid anhydrides.

3. The short oil alkyd resin of claim 2, wherein the aromatic carboxylic acid is phthalic, isophthalic, terephthalic or trimellitic acid.

4. The short oil alkyd resin of claim 2, wherein the cycloaliphatic dibasic carboxylic acid is tetrahydrophthalic, hexahydrophthalic, tetrachlorophthalic, tetrabromophthalic, 3,6-endomethylene-Δ⁴-tetraphthalic or 3,6-endodichloromethylene-Δ⁴-tetraphthalic acid.

TABLE IV

| Test | Pencil hardness | Gasoline resistance | Water resistance | | | Cross-cut tape test after water resistance test | Gloss (60°) |
| --- | --- | --- | --- | --- | --- | --- | --- |
| | | | One day after | Two days after | Five days after | | |
| Test 4 | 2H | ⊚ | ⊚ | ⊚ | 9F | 90/100 | 90. |
| Conventional enamel | 2H | Δ | 9M | 8M | 8D | 10/100 | 80. |
| Remarks | Evaluated by the same manner described in Test 3. | The results were expressed by gloss obtained after effecting twenty-time reciprocating rubbings against the test panels with an automobile gasoline-impregnated gauze. | Immersed in water at 30° C. Evaluated in accordance with ASTM D714-56 | | | Evaluated 5 days after water resistance. Testing method was the same manner described in Test 3 (1). | Evaluated in accordance with the same manner described in Test 3. |

NOTE.—The evaluation symbols, ⊚, ○, Δ, and x, represent "superior" to "poor" in this order with ⊚ being "superior" and x being "poor".

Test 5

There were prepared nitrocellulose lacquer white enamels having the following compositions (by parts, calculated as solid), respectively:

| | | |
| --- | --- | --- |
| Nitrocellulose for paints, RS 1/2 | 100 | 100 |
| Alkyd resin of Example 1 | 200 | |
| Alkyd resin of Note 9 of Test 1 | | 200 |
| Titanium dioxide | 120 | 120 |
| Dibutyl phthalate | 20 | 20 |
| Total | 440 | 440 |

The test panels were prepared in the same manner described in Test 4 except using above-mentioned nitrocellulose laquer white enamels (the enamel being diluted with a lacquer thinner so that the Ford cup No. 4 rating of the diluted enamel is 17–18 seconds).

These two type test panels were tested for comparison, and the results are shown in the following Table V.

5. The short oil alkyd resin of claim 2, wherein the aliphatic dibasic carboxylic acid is succinic, maleic, adipic, azelaic or sebacic acid.

6. The short oil alkyd resin of claim 1, wherein the glycol is ethylene glycol, propylene glycol, 1,2-butanediol, 1,2-pentanediol, 2,3-pentanediol, threo-2,3-pentanediol, erythro-2,3-pentanediol, 3-methyl-1,2-butanediol, trimethylene glycol, β-butylene glycol, 2,4-pentanediol, 2,2-dimethyltrimethylene glycol, 2,2-dimethyl-1,3-butanediol, 2,2-dimethyl-1,3-pentanediol, tetramethylene glycol, 1,4-pentanediol, 3-methyl-2,5-pentanediol, 1,4-hexanediol, 2,5-hexanediol, pentamethylene glycol, 1,5-hexanediol and hexamethylene glycol.

7. The short oil alkyd resin of claim 1, wherein the tri- or tetrahydric alcohol is glycerine, trimethylolethane, trimethylolpropane, 1,2,6-hexanetriol or pentaerythritol.

8. The short oil alkyd resin of claim 1 wherein the fatty acid is a vegetable oil, a vegetable oil fatty acid, a

TABLE V

| | Weather-durability | | Lard resistance |
| --- | --- | --- | --- |
| | Change in color | Change in gloss, 60° | |
| Test panels containing the resin of Example 1. | No. 8 | 80——70 | ○. |
| Test panels containing the resin of Note 9 of Test 1. | No. 6 | 80——50 | x. |
| Remarks | Evaluated in accordance with ASTM D659-44. | Evaluated in accordance with ASTM D532-62T. | A half of the surface or the test panels was coated 100±10µ in thickness with lard, after two hours the grease was wiped off, and then observed the degree of changes in color of said surface compared with another half. |

See note at end of Table IV.

What is claimed is:

1. A short oil alkyd resin containing from 10% to 20% by weight of fatty acids, and consisting essentially of the reaction product of:
   (a) at least one fatty acid having from 6 to 18 carbon atoms;
   (b) at least one polybasic acid; and
   (c) a mixture of at least one primary or secondary glycol with at least one trihydric or tetrahydric alcohol;

tall oil fatty acid or an aliphatic monobasic acid having from 6 to 18 carbon atoms.

9. A short oil alkyd resin containing from 10% to 20% by weight of fatty acids, and consisting essentially of the reaction product of:
   (a) at least one fatty acid having from 6 to 18 carbon atoms and wherein the fatty acid is a vegetable oil, a vegetable oil fatty acid, a tall oil fatty acid or an aliphatic monobasic acid;

(b) at least one polybasic acid selected from the group consisting of aromatic carboxylic acids, cycloaliphatic dibasic carboxylic acids, aliphatic dibasic carboxylic acids and their acid anhydrides, and wherein the aromatic carboxylic acid is phthalic, isophthalic, terephthalic or trimellitic acid, the cycloaliphatic dibasic carboxylic acid is tetrahydrophthalic, hexahydrophthalic, tetrachlorophthalic, tetrabromophthalic, 3,6-endomethylene-$\Delta^4$-tetraphthalic or 3,6-endodichloromethylene-$\Delta^4$-tetraphthalic acid, and the aliphatic dibasic carboxylic acid is succinic, maleic, adipic, azelaic or sebacic acid; and (c) a mixture of at least one primary or secondary glycol with at least one trihydric or tetrahydric alcohol, wherein the glycol is ethylene glycol, propylene glycol, 1,2-butanediol, 1,2-pentanediol, 2,3-pentanediol, threo-2,3-pentanediol, erythro-2,3-pentanediol, 3 - methyl - 1,2 - butanediol, trimethylene glycol, $\beta$-butylene glycol, 2,4-pentanediol, 2,2-dimethyltrimethylene glycol, 2,2-dimethyl-1,3-butanediol, 2,2-dimethyl-1,2-pentanediol, tetramethylene glycol, 1,4-pentanediol, 3 - methyl-2,5-pentanediol, 1,4-hexanediol, 2,5-hexanediol, pentamethylene glycol, 1,5-hexanediol and hexamethylene glycol and the tri- or tetrahydric alcohol is glycerine, trimethylolethane, trimethylolpropane, 1,2,6-hexanetriol or pentaerythritol;

in proportions such that the average number of hydroxy functional groups per each polyol molecule varies substantially linearly from 2.25 to 2.55 at 10% by weight fatty acid to 2.45 to 2.75 at 20% by weight fatty acid.

References Cited

UNITED STATES PATENTS

| | | | |
|---|---|---|---|
| 2,905,650 | 9/1959 | Agens | 260—22 |
| 2,915,486 | 12/1959 | Shelley | 260—21 |
| 3,039,980 | 6/1962 | Mallison | 260—22 |
| 3,223,658 | 12/1965 | Kraft | 260—22 |

FOREIGN PATENTS

| | | | |
|---|---|---|---|
| 559,543 | 7/1958 | Canada | 260—22 |
| 868,574 | 5/1961 | Great Britain | 260—22 |

M. J. WELSH, Primary Examiner

R. W. GRIFFIN, Assistant Examiner

U.S. Cl. X.R.

117—124 E, 132 R, 161 K; 260—33.6 R